UNITED STATES PATENT OFFICE.

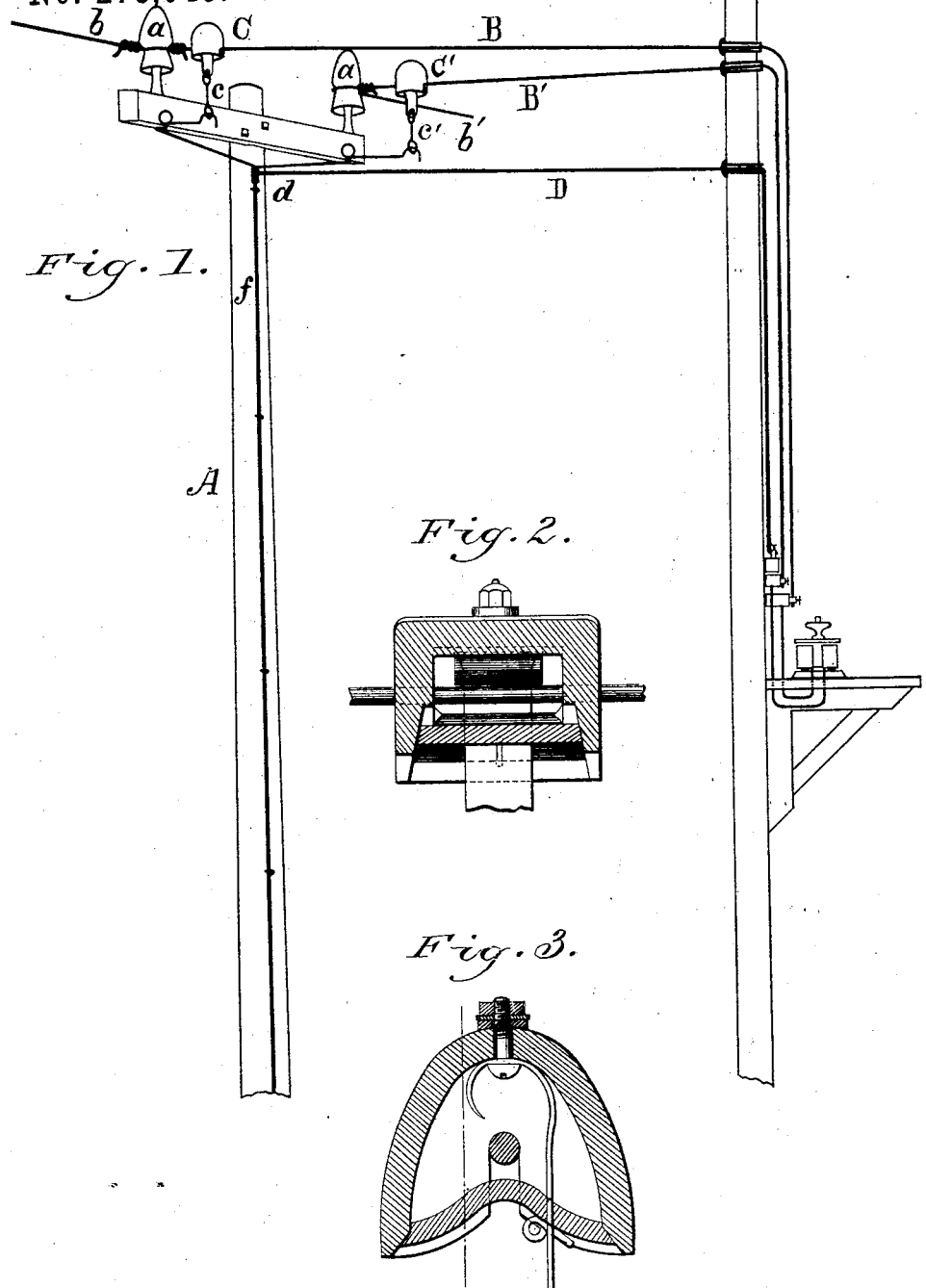

JOHN L. FINN, OF ELYRIA, OHIO.

LIGHTNING-ARRESTER.

SPECIFICATION forming part of Letters Patent No. 273,049, dated February 27, 1883.

Application filed July 17, 1882. (No model.)

*To all whom it may concern:*

Be it known that I, JOHN L. FINN, a citizen of the United States, residing at Elyria, in the county of Lorain and State of Ohio, have invented a new and useful improvement in the arrangement of wires used in connection with a lightning-arrester for the purpose of arresting lightning or free electricity, of which the following is a specification.

My invention relates to a system of arranging or connecting the ground-wire of a telegraph or other electrical instrument with the ground-wire of an outdoor lightning-arrester such as was patented by me on the 3d day of May, 1881, and numbered 240,901, where the free electricity is carried by means of suitable connections into the ground without entering the office or building. The ground-wire D of an electrical instrument, instead of passing directly into the ground from the instrument, returns back out of the office or building to the adjacent pole or place whereon the arresters are supported, and there connects directly with the ground-wire $f$ of said arresters. Said ground-wire of said instruments is intended to subserve all of the purposes of the ordinary ground-wire in use. I attain these objects by the means illustrated in the accompanying drawings, in which—

Figure 1 is an elevation of an ordinary telegraph-pole, showing the lightning-arresters applied to the wire; also, a section of the building, showing the arrangement and connection of the ground-wire of the electrical instrument with the ground-wire of the arresters. Figs. 2 and 3 are detail views, showing the form of lightning-arrester employed.

Similar letters refer to similar parts throughout the views.

A represents a telegraph-pole, which is stationed, as is usual, near the office, and on which is secured the ordinary cross-bar, which supports the insulators $a\ a$.

B represents the wire coming from the east, and B' represents the wire coming from the west. $b$ and $b'$ represent that portion of B and B' outside of and beyond the arresters C and C'. Said wires are in all respects attached in the ordinary manner to the electrical instruments.

C C' represent the arresters, which are adjusted on their respective wires, which may be as fully described in my Patent No. 240,901, to which reference is hereby made, or any other suitable device to accomplish the same or similar result. To each of the arresters is attached a wire, $c\ c'$, which extend thence to a convenient point, $d$, on the body of said pole, where they unite or are connected to the ground-wire $f$, which extends into the ground.

D represents the ground-wire of the electrical instrument, which is connected therewith in the ordinary way, but which extends upward from said instrument, and thence to the ground-wire $f$, and connects with it, as seen at $d$.

The operation of the above-described system of wires is as follows: Free electricity passing from east to west over the line is usually arrested at C, and is carried to the ground over wires $c$ and $f$, thus forming a short circuit; but in many instances there is a strong tendency of the free electricity to follow the line instead of passing into the ground, as in case where there is a strong negative field of electricity beyond the point $d$ the electricity will follow the wires $b$ and $b'$, the better conductor, instead of passing into the ground over the wire $f$ until it reaches such negative field. In that case it freely passes from arrester C over wire $c$, and thence forward over wire $c'$, through arrester C', and on over the main wire $b'$ without passing down the ground-wire $f$ or through the office-instrument. The advantage of connecting the ground-wire D of the office-instrument with the ground-wire $f$ of the arresters is, that while it performs its other functions equally well, it will considerably lengthen the circuit or distance of the arresters from the office and its instrument, and by thus increasing the resistance greatly facilitate the functions of the arresters. This is evident from the fact that free electricity under ordinary circumstances seeks the shortest route to the ground.

What I claim as new, and desire to secure by Letters Patent, is—

1. The combination of the lightning-arresters C C' and the wires $c\ c'$, connecting said lightning-arresters to the ground-wire $f$, with the main wires B B' and the return-wire D, connecting the said main wires through the office-instruments to the said ground-wire $f$, whereby the resistance interposed between the main line and the ground by way of the office-instruments is made materially greater than the resistance interposed between the main line and the ground by way of the lightning-arresters, substantially as set forth.

2. The combination of the arresters C and C', the wires $c$ and $c'$, connecting said lightning-arresters with each other, and the main wires $b$ and $b'$, and thereby connecting the main-line wires $b$ and $b'$ with each other outside of the office at such a distance that the resistance interposed between the main-line wires $b$ and $b'$ at the point of attachment of the arresters C and C' by way of the office is materially greater than by way of the arresters and short wires $c$ and $c'$, thereby forcing free electricity passing along the line in either direction to a negative field beyond the office to pass from one main-line wire to the other by way of the arresters and short wires $c\ c'$ without passing through the office, all substantially as set forth.

J. L. FINN.

Attest:
H. F. WILLSON,
JAS. F. FLOWER.